US006587102B2

(12) United States Patent
Taylor et al.

(10) Patent No.: US 6,587,102 B2
(45) **Date of Patent: *Jul. 1, 2003**

(54) RENDERING PANELS IN MULTIPLE DISPLAY CONTEXTS

(75) Inventors: Thomas H. Taylor, Redmond, WA (US); Susan Cheng-Looi, Issaquah, WA (US)

(73) Assignee: Adobe Systems Incorporated, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/206,500

(22) Filed: Dec. 7, 1998

(65) Prior Publication Data

US 2002/0054085 A1 May 9, 2002

(51) Int. Cl.[7] .................................................. G06F 3/14

(52) U.S. Cl. ....................................... 345/335; 345/762

(58) Field of Search ................................. 345/326, 333, 345/334, 335, 338, 352, 764, 700, 762, 765, 744, 708, 810; 707/500, 526, 529

(56) References Cited

U.S. PATENT DOCUMENTS

| | | | | | |
|---|---|---|---|---|---|
| 5,600,778 | A | * | 2/1997 | Swanson et al. | 345/765 |
| 5,766,773 | A | * | 6/1998 | Paulett et al. | 345/347 |
| 5,900,870 | A | * | 5/1999 | Malone et al. | 345/333 |
| 5,977,966 | A | * | 11/1999 | Bogdan | 345/765 |
| 6,085,197 | A | * | 7/2000 | Federighi et al. | 345/334 |
| 6,085,202 | A | * | 7/2000 | Rao et al. | 707/509 |
| 6,091,411 | A | * | 7/2000 | Straub et al. | 345/762 |

* cited by examiner

*Primary Examiner*—Cao Kevin Nguyen
(74) *Attorney, Agent, or Firm*—Fish & Richardson P.C.

(57) ABSTRACT

A method for describing a panel to be displayed in a plurality of display contexts within a user interface including defining a panel description describing the functionality of the panel, a plurality of resource descriptions each describing the appearance of the panel and a mapping from each display context to one of the plurality of resource descriptions. The method includes associating the mapping and the panel description.

14 Claims, 2 Drawing Sheets

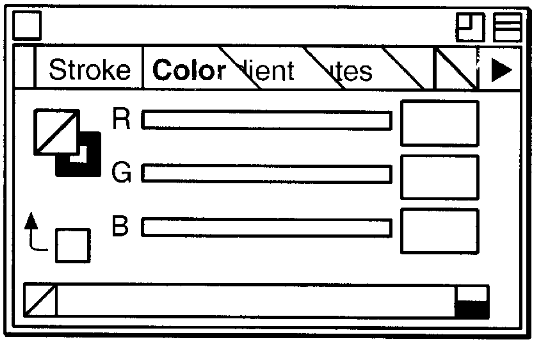
*FIG._1*
*(PRIOR ART)*
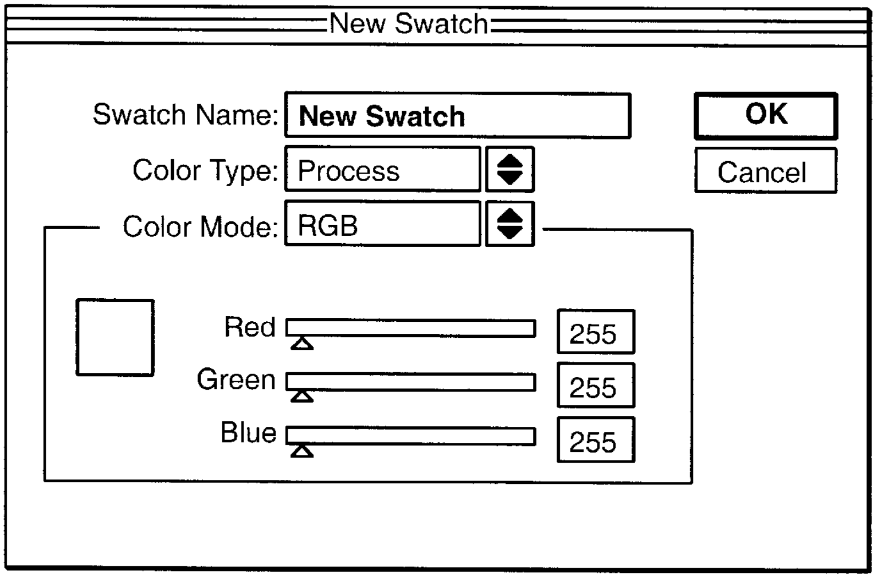
*FIG._2*
*(PRIOR ART)*
COLOR PICKER PANEL
| MENU ID | RESOURCE ID |
|---|---|
| kColorPickerPanelService | kRgbColorPickerRsrcID |
| kColorPickerOptionPanelService | KRgbColorOptionRsrcID |
*FIG._4*

RENDERING PANELS IN MULTIPLE DISPLAY CONTEXTS

BACKGROUND OF THE INVENTION

The present invention relates generally to computer programs, and more specifically, to a method and apparatus for representing and rendering multiple instances of a panel.

Application programs typically include a user interface for displaying graphical elements and data produced during the execution of the program. Application programs often include one or more functional elements that are displayed to allow for selection or other user input in achieving a desired result.

Menus are used in computer programs to provide functionality. Types of menus that a user interface can include are dialog boxes, palettes, pull down menus, pop up hierarchial menus, hierarchial selection menus, textual menus, iconic menus and message boxes.

A menu's descriptive information is typically stored in a resource. Resources are defined by their type and either a resource identifier (i.d.) or name. Typically, each resource has a certain type and each type corresponds to a specific function. For example, the resource type "menu" can be used to describe menus used at the top of a screen. Resources of the same type residing in a program must have a unique resource i.d. For example, an application may have several resources of the type menu as long as each menu has a unique resource i.d.

A menu can include a panel. A panel is a stand alone functional operation or control without a defined appearance. A panel describes an operation and includes control specification as well as definition. Separate simple resources are defined for each panel. A simple resource is a resource that specifies the layout of the user interface elements for a particular instantiation of a panel. A simple resource lists what controls are to be included in a particular instantiation of a panel and where they should go. For example, one type of panel is a color picker, which includes controls allowing a user to choose a color. Typically, the functionality of a panel and appearance or layout at any given location in a user interface are described in one common body of code.

A computer programmer may desire to display a panel in several different formats and in several different places in a program. For example, a computer application may include a color picker that is displayed in a tabbed palette. In addition, a dialog box may include a color picker to allow a user to edit a color. When the color picker is displayed in a palette as shown in FIG. 1, the color picker may be drawn in a compact form. When the picker is displayed in a dialog box as shown in FIG. 2, the color picker can be drawn with a different appearance characterized by a different set of fonts and with controls positioned differently. Depending on where the color picker is used, some controls may be invisible.

A programmer typically writes special case codes to display a panel in more than one place, which adds to the time required to generate and debug a program. If multiple appearances are designed for a panel, such as to instantiate the panel in different types of menus in the user interface, the panel is typically written in multiple different ways, corresponding to each type of appearance. Each instance of the panel includes a unique resource and code that describes the functionality of the panel which is shared by all instances of the panel. Typically, there is a one-to-one relationship between a simple resource and the code that handles user interaction.

SUMMARY OF THE INVENTION

In one aspect, the invention provides a method for describing a panel to be displayed in a plurality of display contexts within a user interface and includes defining a panel description describing the functionality of the panel, a plurality of resource descriptions each describing the appearance of the panel and a mapping from each display context to one of the plurality of resource descriptions. The method includes associating the mapping and the panel description.

The invention includes numerous features. The step of defining a mapping can include building a table having an entry for each display context that includes a pointer to a resource description. The step of defining a mapping can include creating a resource including a table mapping each display context to a resource description. The method can further include separating functional and appearance aspects of the panel description.

In another aspect, the invention provides a resource for use in rendering a panel in a plurality of display contexts within a user interface and includes a panel description describing the functionality of the panel and a mapping associated with the panel description and defining a mapping between each display context and an associated resource description. The resource description describes an appearance of the panel in a particular display context.

In another aspect, the invention provides a method for rendering a panel in a display context within a user interface and includes providing a panel description describing the functionality of the panel and a mapping associated with the panel description and defining a mapping between display contexts and particular resource descriptions. Each resource description describes an appearance of the panel in a particular display context. The mapping is used to locate a particular resource description associated with the display context. The panel is rendered in accordance with the particular resource description and the panel description.

In anther aspect, the invention provides a method defining the appearance of a panel where the panel includes code defining functional aspects of the panel. The method includes defining bindings between simple resources and the code based on a context of use.

Advantages of the invention include one or more of the following. An a extra level of indirection between a panel description and its associated resources is provided. Rather than a one-to-one relationship between the resource and the panel description, there is a many-to-one relationship. Different resources can be specified to define different layouts in the same panel, but only a single block of code defined by a panel description is required to control the different instantiations of the panel. This code is shared among the resources thereby minimizing the amount of code required to be produced initially and maintained when supporting multiple instances of a panel. The use of common control code also facilitates consistency across the program.

BRIEF DESCRIPTION OF THE DRAWING

FIG. 1 is a user interface including a panel rendered in a palette.

FIG. 2 is a user interface including a panel rendered in a dialog box.

FIG. 4 is a menu identifier resource panel.

DETAILED DESCRIPTION

Figure 3:
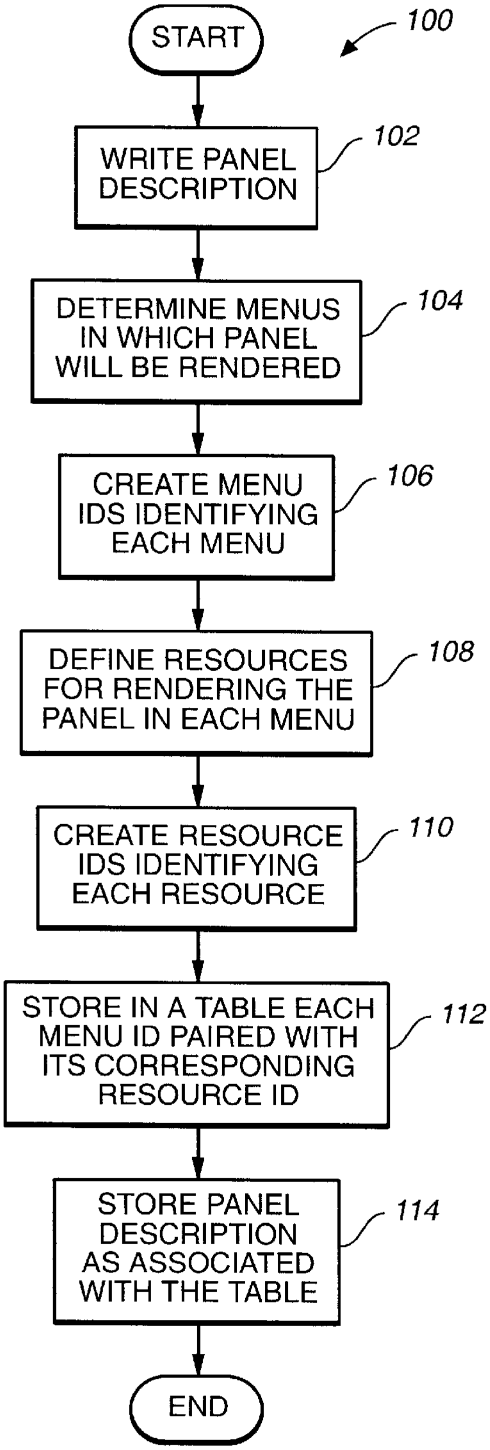
FIG. 3 is a flow diagram illustrating the steps for defining a panel and its appearance.

Referring now to FIG. 3, a process 100 for generating a panel description and its appearance in a program includes writing a panel description (102). The panel description includes the functional description for all of the functional elements to be included in the panel. For example, a color picker may include sliders, edit boxes, static text labels and a color display switch. Associated with the functional description is underlying code that controls the operation of each of the functional elements included in a panel. For example, routines for controlling a slider or for manipulating a color display switch are required in order to control the functional element in a particular instantiation of the panel. This underlying code can be shared among the resources and is only required to be generated once, thereby minimizing the amount of code required to be initially produced and maintained when supporting multiple instances of a panel. The use of common code also facilitates consistency across the program.

The menus in which a panel will be rendered are identified (104). A menu identifier identifying each menu in which the panel will be used is created (106). The menu identifier uniquely identifies each location in the program where an instantiation of the panel is to be rendered. The menu identifier can be the resource name or identifier used in identifying the particular menu in the program.

The resources for rendering the panel in each menu are defined (108). The resources include descriptive information for the appearance of a particular instantiation of the panel. A resource, or resource description as it is often referred to, defines a panel's particular appearance and includes details of what controls are used and where the controls are positioned in the panel. If one panel has three different appearances then three different resource descriptions for that panel are required. Two distinct resource descriptions are required to develop the differing appearances for the color pickers shown in FIGS. 1 and 2. Resources can be defined by their type and either a resource identifier (i.d.) or name.

Resource identifiers are created identifying each resource for each rendered panel (110). Resources of the same type residing in a program must have a unique resource i.d. An application can have several resources of the same type as long as each has a unique resource i.d.

A table is created which includes a mapping for each menu identifier to a particular resource identifier (112). The particular resource identifier points to the resource used to generate the panel for a given menu. A table is used to identify all of the locations where the panel is to be used in a program. For each item in the table, a corresponding resource identifier indicates which resource description should be used in creating the panel. The table is a user editable resource for associating a particular resource description with a particular instantiation of the panel. The table structure includes a mapping of menu identifiers to an associated resource identifier. Resources may be redefined or otherwise modified without affecting the panel description. The resource mapping may be modified without affecting either the resource or the panel description. In addition, once generated, a single resource may be linked to a plurality of menus. An example of a table including mapping between menu identifiers and an associated resource identifier is shown in FIG. 4.

Finally, the panel description is stored and associated with the table (114). The panel description, the table or a resource can be independently edited, as appropriate, to effectuate change in the functionality or the appearance of a panel in the program.

Figure 5:
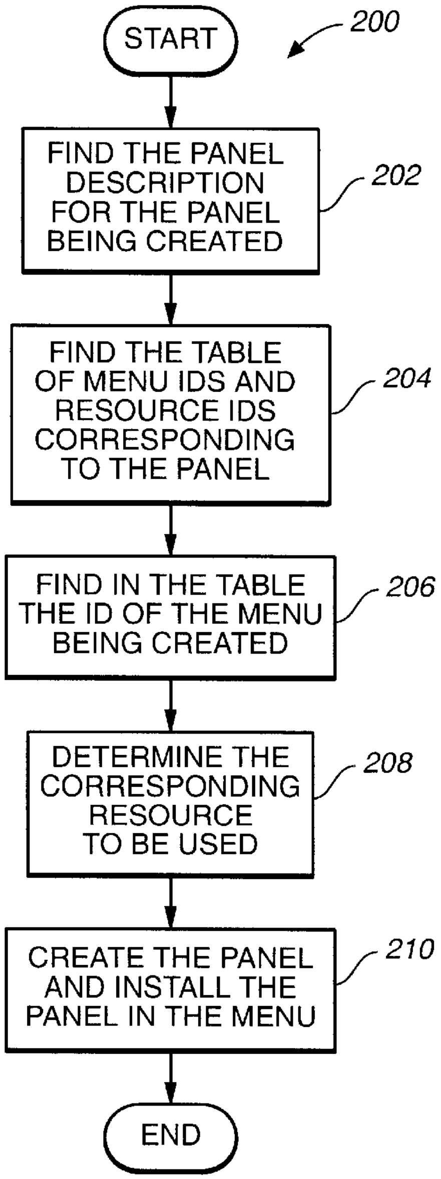
FIG. 5 is a flow chart illustrating the steps of rendering a panel in a menu.

Referring now to FIG. 5, a process 200 of rendering a panel and displaying it in a menu includes locating the panel description for the panel being created (202). The table associated with the panel description that includes the menu identifiers and resource identifiers corresponding to the panel is located (204). The table is searched to locate the particular menu identifier for the menu being created (206). The resource identifier associated with the located menu identifier and corresponding to the resource to be used in generating the menu is determined (208). The particular panel is created and installed in the menu by executing the corresponding resource indicated by the resource identifier determined in step 208 (210).

In an alternative implementation, the panel description definition and resource description may be accomplished by separate entities for a given instantiation of a panel. For example, a third party vendor may make use of the panel description and table architecture described above to create a instantiation of a panel having a custom appearance. The definition of the custom appearance can be created by a resource description generated by the third party vendor. However, the code required to control the various functional elements within the custom panel may be provided (shared) with other resources supplied with the program.

The present invention has been described in terms of specific embodiments, which are illustrative of the invention and are not to be construed as limiting. Other embodiments of the invention are within the scope of the following claims.

What is claimed is:

1. A method for describing a panel to be displayed in a plurality of display contexts within a user interface, the panel including a panel description defining a functional operation or control without a defined appearance, the method comprising:

defining a panel description describing the functionality of the panel;

defining a plurality of resource descriptions each describing an appearance of the panel in one or more of the plurality of display contexts, where each display context defines where the panel is used;

defining a mapping from each of the plurality of display contexts to one of the plurality of resource descriptions; and associating the mapping and the panel description.

2. The method of claim 1 where step of defining a mapping includes building a table having an entry for each display context that includes a pointer to a resource description.

3. The method of claim 1 where the step of defining a mapping includes creating a resource including a table mapping each display context to a resource description.

4. The method of claim 1 further including separating functional and appearance aspects of the panel description.

5. The method of claim 1 wherein defining a plurality of resource descriptions includes defining two resource descriptions each describing an appearance of the panel in a first display context or a second display context, the first display context specifies a tabbed palette and the second display context specifies a dialog box.

6. The method of claim 5, wherein the panel is a color picker, and defining a plurality of resource descriptions includes defining a first resource description describing an appearance of the color picker in a tabbed palette and defining a second resource description describing an appearance of the color picker in a dialog box.

7. The method of claim 6 includes defining a mapping from a tabbed palette to the first resource description and defining a mapping from a dialog box to the second resource description.

8. The method of claim 1 wherein each display context specifies a type of menu selected from a group consisting of a dialog box, a palette, a pull down menu, a pop up hierarchical menu, a hierarchical selection menu, a textual menu, an icon menu, and a message box.

9. A resource for use in rendering a panel in a plurality of display contexts within a user interface, the panel including a panel description defining a functional operation or control without a defined appearance, the resource comprising:

a plurality of resource descriptions each describing an appearance of the panel in one or more of the plurality of display contexts, where each display context defines where the panel is used; and a mapping associated with the panel description and defining a mapping between each of the plurality of display contexts and an associated resource description of the plurality of resource descriptions.

10. A method for rendering a panel in a plurality of display context within a user interface, the panel including a panel description defining a functional operation or control without a defined appearance, the method comprising:

providing a panel description describing the functionality of the panel;

providing a plurality of resource descriptions each describing an appearance of the panel in one or more of the plurality of display contexts, where each display context defines where the panel is used;

providing a mapping associated with the panel description and defining a mapping between the plurality of display contexts and particular resource descriptions of the plurality of resource descriptions;

using the mapping to locate a particular resource description of the plurality of resource descriptions that is associated with the display context; and rendering the panel in accordance with the particular resource description and the panel description.

11. A method for defining the appearance of a panel where the panel includes code defining functional aspects of the panel but does not include a defined appearance, the method comprising:

defining bindings between simple resources and the code based on a context of use of the panel within a user interface, each simple resource defining an appearance for the panel in one or more of the plurality of display contexts, where each display context defines where the panel is used.

12. A method for describing a panel to be displayed in a plurality of display contexts within a user interface, the method comprising:

defining a panel description describing the functionality of the panel;

defining a plurality of resource descriptions each describing an appearance of the panel in one or more of the plurality of display contexts, where each display context defines where the panel is used;

defining a mapping having at least two display contexts each being mapped to one of the plurality of resource descriptions; and associating the mapping and the panel description.

13. A method for describing a panel to be displayed in a plurality of display contexts within a user interface, the method comprising:

defining a panel description describing the functionality of the panel, the panel including a plurality of controls;

defining a plurality of resource descriptions each describing an appearance of the panel in one or more of the plurality of display contexts, where each display context defines where the panel is used;

defining a mapping from each of the plurality of display contexts to one of the plurality of resource descriptions; and associating the mapping and the panel description.

14. A method for describing a panel to be displayed in a plurality of display contexts within a user interface, the method comprising:

defining a panel description describing the functionality of the panel;

defining a plurality of resource descriptions each describing an appearance of the panel in one or more of the plurality of display contexts, where each display context defines where the panel is used; and associating one of the plurality of resource descriptions with the panel description for each of the plurality of display contexts.

* * * * *

UNITED STATES PATENT AND TRADEMARK OFFICE

CERTIFICATE OF CORRECTION

PATENT NO. : 6,587,102 B2
DATED : July 1, 2003
INVENTOR(S) : Thomas H. Taylor and Susan Cheng-Looi It is certified that error appears in the above-identified patent and that said Letters Patent is hereby corrected as shown below:

Title page,
Item [56] References Cited, please replace "5,766,773, to Paulett et al." with -- 5,760,773 to Berman et al. -- therefor.

Signed and Sealed this

Twenty-ninth Day of June, 2004

JON W. DUDAS
*Acting Director of the United States Patent and Trademark Office*